США Patent Office 3,816,561
Patented June 11, 1974

---

3,816,561
POLYESTER COMPOSITIONS FROM TRANS-PIPERYLENE-MALEIC ACID ADDUCTS AND HYDROGENATED BISPHENOL A
Takeo Hokama, Chicago, Ill., assignor to Velsicol Chemical Corporation, Chicago, Ill.
No Drawing. Filed Mar. 13, 1972, Ser. No. 234,368
Int. Cl. C08g 17/12, 21/00, 21/02
U.S. Cl. 260—871         10 Claims

ABSTRACT OF THE DISCLOSURE

This invention discloses a linear polyester comprising from about 10 to about 40 mole percent of an adduct of trans-piperylene and maleic acid or its anhydride; from about 10 to about 40 mole percent of dicarboxylic compound selected from the group consisting of maleic acid, maleic anhydride, fumaric acid, and mixtures thereof; and from about 50 to 70 mole percent glycol wherein about 10 to 100 mole percent of said glycol is hydrogenated bisphenol A.

---

This invention relates to polyester compositions and more particularly relates to unsaturated, air-drying polyester compositions having long pot lives when admixed with monomeric ethylene derivatives to form curable compositions.

Unsaturated polyesters are typically admixed with monomeric ethylene derivatives copolymerizable with the unsaturation in the polyester via free radical addition polymerization to form polymerizable mixtures. Such mixtures are usually stabilized by adding polymerization inhibitors to prevent gelation and increase the storage or shelf life of the mixtures. When it is desired to utilize the polymerizable mixtures to form hard coatings, a catalyst and optionally an accelerator or promoter is added to the mixture shortly prior to coating the mixture on the desired substrate. The time period after addition of the catalyst until polymerization has progressed to where the polymerizable mixture can no longer be easily handled or coated onto a substrate by conventional coating equipment is referred to as the pot life of the mixture.

The pot life of curable polyesters varies considerably with the structural and chemical nature of the polyester as well as the chemical nature of the catalysts. Thus while some polyesters have pot lives of up to and exceeding 6 hours other polyesters cure in a matter of minutes upon addition of the catalyst.

One important group of polyesters is prepared from an adduct of trans-piperylene and maleic anhydride, a second decarboxylic compound selected from the group consisting of maleic acid, maleic anhydride, fumaric acid, and mixtures thereof and glycol. These polyesters have air drying properties, i.e. they cure in thin films at ambient temperatures and in the presence of air to a hard non-tacky surface. While these polyesters have great utility in the coatings industry it was found that they exhibit somewhat short pot lives ranging in the order of from about 5 to aobut 10 minutes.

It has now been found that when hydrogenated bisphenol A is incorporated into the backbone of the above-described polyester as a part of the glycol component a polyester having a much longer pot life is obtained while still retaining the fast air drying characteristics of the unmodified polyester. Thus, one embodiment of the present invention resides in a linear polyester comprising from about 10 to about 40 mole percent of an adduct of trans-piperylene and maleic acid or its anhydride; from about 10 to about 40 mole percent of dicarboxylic compound selected from the group consisting of maleic acid, maleic anhydride, fumaric acid and mixtures thereof; and from about 50 to 70 mole percent glycol wherein about 10 to about 100 mole percent of said glycol is hydrogenated bisphenol A.

In a preferred embodiment of the present invention the polyester comprises from about 10 to about 30 mole percent of the adduct, from about 20 to about 40 mole percent of said dicarboxylic compound and from about 50 to about 60 mole percent glycol wherein about 10 to about 50 mole percent of the glycol is hydrogenated bisphenol A.

Hydrogenated bisphenol A is the common name for a compound which is an article of commerce and has the following structural formula

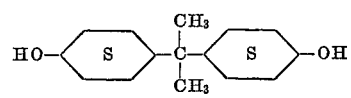

The adduct of trans-piperylene and maleic anhydride, i.e. cis-3-methyl-4-cyclohexene-cis,cis-1,2-dicarboxylic anhydride M.P. 63–65° C. imparts the air drying properties to the polyester of the present invention. This material will hereinafter be referred to as Beta-PMAA.

The preparation of Beta-PMAA can be carried out by the following procedure. Maleic anhydride and a small amount of an inert aromatic hydrocarbon solvent (about 10 to 30 percent by weight based on the maleic anhydride) such as toluene or xylene, are charged into a suitable reaction vessel and are heated until the mixture becomes homogeneous. At least an equimolar amount of trans-piperylene is then slowly added to the reaction vessel with vigorous stirring and sufficient cooling to maintain the reaction temperature between about 40 and about 80° C. After the addition is completed further stirring and maintaining of the temperature for a period of up to about 3 hours can be desirable to insure the completion of the reaction. After this time the adduct of trans-piperylene and maleic anhydride can be recovered in excellent yields and high purity as a white solid having a melting point of 63 to 65° C. upon distillation of the reaction products under reduced pressure.

The Beta-PMAA is thermodynamically less stable than certain of its stereoisomers. Consequently, care must be taken during distillation so as to prevent undesired isomerization of its carboxyl groups or rearrangement of its unsaturation. In particular, during distillation the system must be kept free of acids, bases and transition metal salts.

The linear polyester of the present invention can also include one or more diacid, anhydride or other ester forming derivatives of dicarboxylic acids in addition to the required unsaturated dicarboxylic compounds. These compounds can be selected from the group consisting of aliphatic, cycloaliphatic and aromatic dicarboxylic acids and anhydrides. The compounds can be unsubstituted or substituted wherein the substituents are substantially inert to polymerization, such as halogen, nitro or cyano. Exemplary of suitable acids and anhydrides are chlorendic, phthalic, isophthalic, carbic, hydrogenated carbic, succinic, adipic and tetrachloro and tetrabromobenzene dicarboxylic acids. These compounds can comprise from about 5 to about 60 mole percent of the total dicarboxylic component used in making the essentially linear polyester.

Fire retardant coatings and articles can be prepared by the use of halogenated dicarboxylic compounds, as well as by the use of phosphorus compounds, in the polyesters of the present invention using techniques known to the art. Where fire retardant coatings or articles are desired the polymerizable mixture should contain at least 6% bromine, at least 12.5% chlorine or at least 3.5% phosphorus, preferably contributed to the mixture by one or more of the above halogen containing compounds, particularly a compound selected from the group consisting of chlorendic anhydride, dichloroendic anhydride, dibromoendic anhydride, chlorendic acid, tetrachlorophthalic acid, tetrachlorophthalic anhydride, tetrachloroterephthalic acid, tetrabromophthalic anhydride, tetrabromophthalic acid and tetrabromoterephthalic acid.

Glycol is required in the linear polyester of the present invention. In addition to the hydrogenated bisphenol A a glycol can be selected from the group consisting of ethylene glycol, di-, tri-, tetra-, and higher -ethylene glycols, propylene glycol, trimethylene glycol, polypropylene glycol, dipropylene glycol, 2,2-dimethyl-1,3-propane-diol, 1,3-butylene glycol, and the like. As previously indicated the amount of glycol used to prepare the polyesters of this invention ranges from about 50 to about 70 mole percent wherein from about 10 to about 100 mole percent of said glycol is hydrogenated bisphenol A.

The linear polyester of the present invention can be prepared readily using one of the standard procedures known to the art such as the fusion cook or solvent methods. For example the ingredients can be combined with a quantity of an inert solvent such as xylene and heated to reflux in a nitrogen atmosphere. The water formed in the reaction is azeotroped with the inert solvent and removed by means known to the art. The inert solvent remaining in the reaction mixture at or near the end of the reaction can be removed by heating, by sparging with an inert gas or by the application of vacuum. The reaction is preferably continued until a low acid number, such as about 40 or less and more preferably about 35 or less, is obtained. Although the resulting polyester can be isolated as such, it is preferred to prepare the composition in the form in which the polyester is to be used and transport or store the compositions in that form.

A useful composition of the polyester of the present invention is a liquid, hardenable polymerizable mixture comprising the said polyester and at least one monomeric ethylene derivative copolymerizable by free radical addition polymerization with the unsaturation in the polyester. monomeric ethylene derivatives copolymerizable with the unsaturation in polyesters via free radical addition polymerization and their use are known to the art and are exemplified by those of the styrene, vinyl ester and acrylate type. The styrene type ethylene derivatives can be described by the following structural formula:

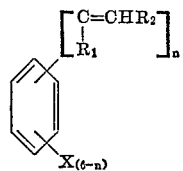

wherein $R_1$ and $R_2$ are independently selected from the group consisting of hydrogen and alkyl; $n$ is an integer greater than zero and less than six, preferably from one to two; and each X is independently selected from the group consisting of hydrogen, alkyl and halogen. The acrylic monomers can be described by the following structural formula

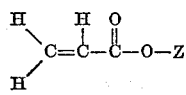

wherein Y and Z are independently selected from the group consisting of hydrogen and alkyl. The alkyl groups in the above formulas preferably contain from one to ten carbon atoms.

The preferred ethylene derivatives for copolymerization with the polyester are styrene, vinyl toluenes, chlorostyrenes, vinyl acetate, vinyl benzoate, methyl acrylate, ethyl acrylate, methyl methacrylate, butyl acrylate and a mixture of styrene and methyl methacrylate.

Other ethylene derivatives can be used in place of or with those described above. Exemplary of these are: diacetone acrylamide, alpha unsaturated vinyl ketones such as vinyl methyl ketone, alpha unsaturated vinyl sulfones as divinyl sulfone; vinyl esters of saturated and unsaturated mono- and polycarboxylic acids such as vinyl propionate and succinic acid divinyl esters; N-vinyl lactams such as N-vinyl pyrrolidone and N-vinyl caprolactam; and vinyl ethers of mono- and polyhydro compounds such as isobutyl vinyl ether and butane diol-1,4-divinyl ether.

The liquid, hardenable polymerizable mixture comprises from about 20 to about 80% by weight of the polyester; from about 20 to about 80% by weight of the ethylene derivatives or ethylene derivative-acrylate mixture.

The polymerizable mixtures may be stabilized by adding the usual polymerization inhibitors to prevent gelation and increase the storage or shelf life of the mixture. Suitable inhibitors are for example mono- and polyhydric phenols such as hydroquinone, benzoquinone, resorcinol, pyrocatechol and the like. Only a small amount of inhibitor is required such as from about 0.005 to about 0.1% based on the weight of the mixture. It is preferable to add from about 0.01 to about 0.03% inhibitor.

The polymerizable mixtures described above can be stored for long periods of time without appreciable polymerization. In order to utilize the mixtures polymerization is initiated by the addition of catalysts, particularly the peroxide and hydroperoxide catalysts. Examples of especially suitable catalysts are methyl ethyl ketone peroxide, cyclohexanone peroxide, $t$-butyl hydroperoxide, benzoyl peroxide, lauroyl peroxide, $t$-butyl perbenzoate, $t$-butyl permaleate and di-$t$-butyl peroxide. Other catalysts which can be used to initiate or accelerate the polymerization reaction are the azo compounds such as azo-bis-isobutyronitrile and azo-bis-isobutyric acid dibutyl ester, and redox systems consisting of a peroxide and a tertiary amine. A small amount of catalyst such as for example between 0.2 and 3.0 percent by weight of the polymerizable mixture has been found to be sufficient.

In conjunction with the catalysts, an accelerator or promoter, such as the metal driers are commonly used in polyester solution to enhance curing, i.e. crosslinking, at ambient temperatures. The naphthenates of the metals iron, cobalt, nickel, manganese, chromium, lead, vanadium, zinc, zirconium, cerium, aluminum and calcium are especially suitable. In addition the resinates, octoates or linoleates of metal compounds soluble in the polymerizable mixture may be used. Often it is desirable to add mixtures of the various driers to obtain particular properties. The driers are normally used in an amount between about 0.01 and 1.0 percent of the metal based on the weight of the polymerizable mixture.

The polymerizable mixtures described above are particularly useful in coating substrates, in the presence of oxygen, particularly in the presence of air, with a coating having a hard, dry surface within less than about 2 hours and often less than about 1 hour. Coating can be accomplished by applying to the substrate the liquid, hardenable polymerizable mixture and a free radical catalyst therefore at room temperature until the surface of the coating is dry. The polymerizable mixture also can be used to coat a substrate in the presence of oxygen with a coating having a hard dry surface in less than 15 minutes by applying the mixture and the free radical catalyst as above and then heating the coated substrate to a temperature above about 50° C. and preferably below about 150° C. until the surface of the coating is dry.

The preparation and properties of the linear polyester and the polymerizable mixtures of the present invention are more specifically illustrated in the following examples.

EXAMPLE 1

Preparation of a Polyester

Beta-PMAA (0.80 moles), diethylene glycol (1.7 moles), hydrogenated bisphenol A (1.1 moles) and toluene (50 ml.) were charged into a glass reaction flask equipped with a dropping funnel, stirrer, thermometer and a Snyder column connected to a Dean-Stark trap and Friedrich condenser. Both the dropping funnel and the condenser were connected to nitrogen lines allowing the maintenance of an inert atmosphere over the reaction mixture. The reaction flasks was then flushed with nitrogen and the reaction mixture was heated to a temperature of 210° C. with stirring. The reaction temperature was maintained by the addition of toluene and adjusting the amount of refluxing toluene. After five hours at 210° C. the reaction mixture was cooled to approximately 60° C. and sampled for its acid value. An acid value of 26.6 was observed. Fumaric acid (1.9 moles) was charged into the reaction flask and the mixture was heated at 195° C. for a period of about 3 hours. After this time the reaction mixture was stripped of toluene, unreacted starting materials and half esters. The reaction mixture was then cooled to yield the desired polyester having an acid value of 21.6 and hydroquinone inhibitor (200 p.p.m.) was added thereto. Styrene monomer was then added to the polyester at a temperature of about 100° C. in an amount sufficient to result in a 60 percent solution of the polyester in styrene.

EXAMPLE 2

Preparation of a Polyester

Beta-PMAA (0.6 moles), fumaric acid (1.4 moles), hydrogenated bisphenol A (0.26 moles) and diethylene glycol (1.84 moles) were charged into a glass reaction flask equipped with a mechanical stirrer, internal thermometer, gas inlet tube and reflux condenser provided with a Dean-Stark trap. Nitrogen gas was passed through the vapor space of the flask to exclude air and a blanket of the gas was maintained over the reaction mixture during the reaction. The contents of the flask were stirred and heated at reflux (190–200° C.). The water produced by the reaction was removed from the azeotrope and collected in the Dean-Stark trap. The mixture was heated at reflux until the acid number of the polyester was 36.4. After this time the reaction mixture was stripped of toluene, unreacted starting materials and half esters. Benzoquinone (200 p.p.m.) and styrene in an amount sufficient to provide a 60 percent solution were added to the polyester to yield a polymerizable mixture in accordance with the present invention.

To demonstrate the effectiveness of the present invention a number of polyesters were prepared and their pot life and film curing time or press free time were determined. The pot life often referred to as gel time is determined by a procedure wherein the polyester blended with an ethylenically unsaturate dcompound as hereindescribed and containing stabilizer is mixed with methyl ethyl ketone peroxide catalyst (1.5% by weight) and cobalt naphthenate promoter (1.0% by weight). This mixture is then stirred in a 10 dram glass via with a glass rod until gelation occurs. The pot life is the time period between the catalyst and promoter addition and gelation occurs as evidenced by the ability to lift the main body of the resin in the vial by the glass rod.

The press freee time is determined by drawing a 1.5 mil film of the catalyzed polymerizable mixture onto a steel panel and measuring the elapsed time until a cotton ball can be pressed onto the surface of the film and brushed off the film without leaving cotton fibers adhering to the surface.

In each of the following examples the polyester was dissolved in styrene to a concentration of 60 percent by weight. For the sake of brevity hydrogenated bisphenol A is represented by HBPA and diethylene glycol by DEG.

| | Molar ratio | Pot life (minutes) | Press free time (minutes) |
|---|---|---|---|
| Example 3: | | | |
| Beta-PMAA | 0.29 | 69 | 50 |
| Fumaric acid | 0.71 | | |
| HBPA | 0.41 | | |
| DEG | 0.62 | | |
| Example 4: | | | |
| Beta-PMAA | 0.30 | 20 | 81 |
| Fumaric acid | 0.70 | | |
| HBPA | 0.13 | | |
| DEG | 0.92 | | |
| Example 5: | | | |
| Beta-PMAA | 0.30 | 185 | 77 |
| Fumaric acid | 0.70 | | |
| HBPA | 0.46 | | |
| Propylene glycol | 0.59 | | |
| Example 6: | | | |
| Beta-PMAA | 0.30 | 105 | 76 |
| Fumaric acid | 0.70 | | |
| HBPA | 0.42 | | |
| Dipropylene glycol | 0.60 | | |
| Example 7: | | | |
| Beta-PMAA | 0.30 | 77 | 105 |
| Fumaric acid | 0.70 | | |
| HBPA | 0.45 | | |
| Neopentyl glycol | 0.60 | | |
| Example 8: | | | |
| Beta-PMAA | 0.30 | 31.5 | 57.5 |
| Fumaric acid | 0.70 | | |
| HBPA | 0.10 | | |
| DEG | 0.93 | | |
| Example 9: | | | |
| Beta-PMAA | 0.30 | >120 | 30 |
| Fumaric acid | 0.70 | | |
| HBPA | 1.06 | | |
| Example 10: | | | |
| Beta-PMAA | 0.30 | 5 | 71 |
| Fumaric acid | 0.70 | | |
| DEG | 1.025 | | |
| Example 11: | | | |
| Beta-PMAA | 0.50 | 7 | 45 |
| Fumaric acid | 0.50 | | |
| Propylene glycol | 1.20 | | |
| Example 12: | | | |
| Beta-PMAA | 0.50 | 9 | 79 |
| Fumaric acid | 0.50 | | |
| Dipropylene glycol | 1.01 | | |

The data presented in the above example demonstrates the increase in the pot life of the polyesters of the present invention as compared to similar polyesters which do not contain hydrogenated bisphenol A as a glycol component.

I claim:

1. A linear polyester comprising from about 10 to about 40 mole percent of an adduct of trans-piperylene and maleic acid or its anhydride; from about 10 to about 40 mole percent of dicarboxylic compound selected from the group consisting of maleic acid, maleic anhydride, fumaric acid, and mixtures thereof; and from about 50 to 70 mole percent glycol wherein about 10 to 100 mole percent of said glycol is hydrogenated bisphenol A.

2. The polyester of claim 1 wherein the adduct is cis-3-methyl - 4 - cyclohexene-cis,cis-1,2-dicarboxylic anhydride having a melting point of about 63 to 65° C.

3. The polyester of claim 1 wherein the glycol component consists of hydrogenated bisphenol A and a glycol selected from the group consisting of ethylene glycol, diethylene glycol, triethylene glycol, polyethylene glycol, 1,2-propylene glycol, trimethylene glycol, dipropylene glycol, polypropylene glycol, 2,2-dimethyl-1,3-propane diol and butylene glycol.

4. The polyester of claim 1 comprising from about 10 to about 30 mole percent of the adduct of transpiperylene and maleic acid or its anhydride; from about 20 to about 40 mole percent of dicarboxylic compound selected from the group consisting of maleic acid, maleic anhydride, fumaric acid, isophthalic acid and mixtures thereof; and from about 50 to about 60 mole percent glycol wherein about 10 to about 50 mole percent of the glycol is hydrogenated bisphenol A.

5. The polyester of claim 1 wherein said glycol consists of diethylene glycol and hydrogenated bisphenol A.

6. A liquid, hardenable polymerizable mixture comprising the polyester of claim 1 and at least one monomeric ethylene derivative copolymerizable by free radical addition polymerization with the unsaturation in the polyester.

7. The polymerizable mixture of claim 6 wherein the ethylene derivative is selected from the group consisting of styrene, vinyl toluene, chlorostyrene, vinyl acetate, vinyl benzoate, methyl acrylate, ethyl acrylate, methyl methacrylate, butyl acrylate and mixtures thereof.

8. The composition of claim 6 wherein the ethylene derivative is styrene.

9. The composition of claim 6 wherein the ethylene derivative is butyl acrylate.

10. The composition of claim 6 wherein the polyester comprises from about 20 to about 80 percent by weight and the ethylene derivative comprises from about 20 to about 80 percent by weight.

References Cited

UNITED STATES PATENTS

| | | | |
|---|---|---|---|
| 3,663,658 | 5/1972 | Scardiglia et al. | |
| 2,828,278 | 3/1958 | Kosmin | 260—871 |
| 3,493,631 | 2/1970 | Christenson et al. | 260—834 |
| 3,536,782 | 10/1970 | Toggweiler et al. | 260—869 |

FOREIGN PATENTS

| | | |
|---|---|---|
| 1,255,070 | 11/1971 | Great Britain. |
| 13,866 | 9/1962 | Japan. |
| 1,918,061 | 11/1969 | Germany. |

OTHER REFERENCES

Arkdzhovskii et al., *Plast. Massy 1969*, 23–26.

Arkdzhovskii et al., *Sb. Tr., Vses. Nauch-Issled.-Inst. Novykh Stroit. Mater*, 7, 110–20 (1966).

*Chem. Abstr. 71*, Subject Index, 1028 (1969).

MELVIN GOLDSTEIN, Primary Examiner

U.S. Cl. X.R.

260—75A, 863, 869

UNITED STATES PATENT OFFICE
CERTIFICATE OF CORRECTION

Patent No. 3,816,561                     Dated June 11, 1974

Inventor(s) Takeo Hokama

It is certified that error appears in the above-identified patent and that said Letters Patent are hereby corrected as shown below:

In column 3, lines 66 to 70 the portion of the formula appearing as

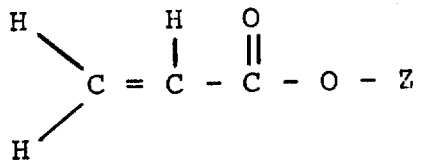

should read as follows:

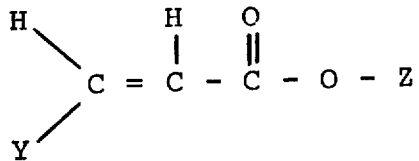

Signed and sealed this 1st day of October 1974.

(SEAL)
Attest:

McCOY M. GIBSON JR.
Attesting Officer

C. MARSHALL DANN
Commissioner of Patents